July 7, 1936.  J. KROHN  2,046,878

AUTOMATIC POWER TRANSMISSION

Filed Oct. 29, 1934    3 Sheets-Sheet 1

INVENTOR
John Krohn
John A. Naismith
ATTORNEY

July 7, 1936.                    J. KROHN                    2,046,878
                        AUTOMATIC POWER TRANSMISSION
                    Filed Oct. 29, 1934         3 Sheets—Sheet 2

INVENTOR
John Krohn
John A. Naismith
ATTORNEY

July 7, 1936.   J. KROHN   2,046,878
AUTOMATIC POWER TRANSMISSION
Filed Oct. 29, 1934   3 Sheets-Sheet 3

INVENTOR
John Krohn
John A. Naismith
ATTORNEY

Patented July 7, 1936

2,046,878

UNITED STATES PATENT OFFICE 2,046,878

AUTOMATIC POWER TRANSMISSION

John Krohn, Santa Clara County, Calif.

Application October 29, 1934, Serial No. 750,551

6 Claims. (Cl. 74—294)

This invention relates to the type of mechanism described in the specification of my pending application, Serial Number 713,320, dated February 28, 1934, and is a further development of the same and having similar objects in mind.

It is, therefore, the principal object of the invention to provide a power transmitting mechanism which automatically transmits or multiplies drive shaft forces in accordance with the load on the driven shaft. Other important objects in order to make such a mechanism commercially successful are simple, durable, and practical construction, compact dimensions, and proper performance.

Figure 1:
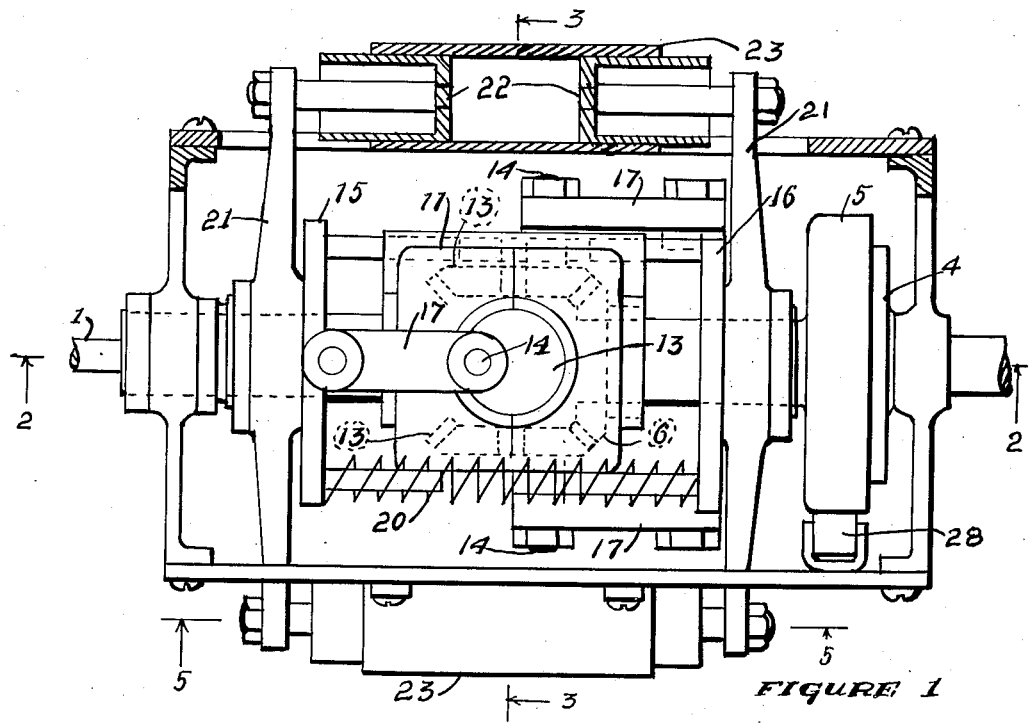
Figure 1 is a plan view of a device embodying my invention, partly in section.
Figure 2:
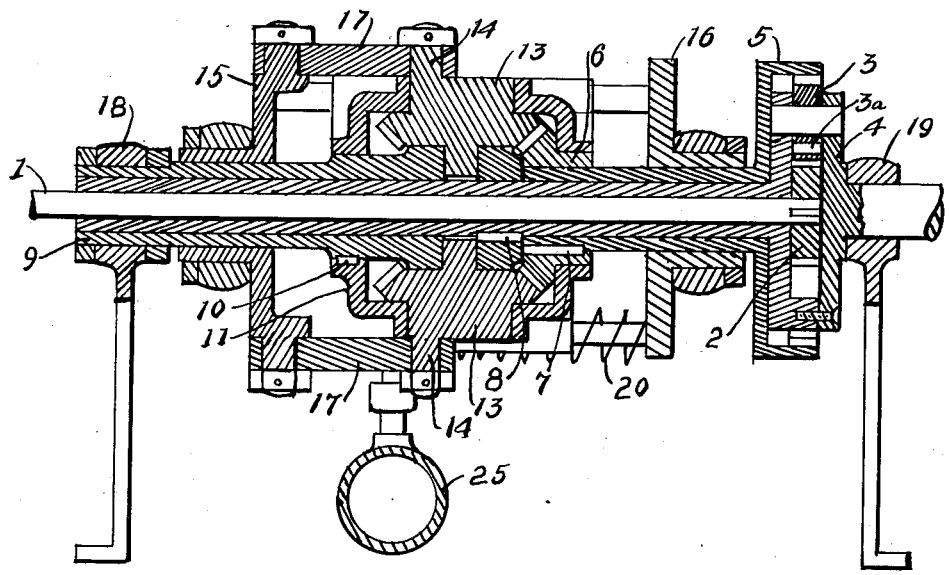
Figure 2 is a view on line 2—2 of Figure 1.
Figure 3:
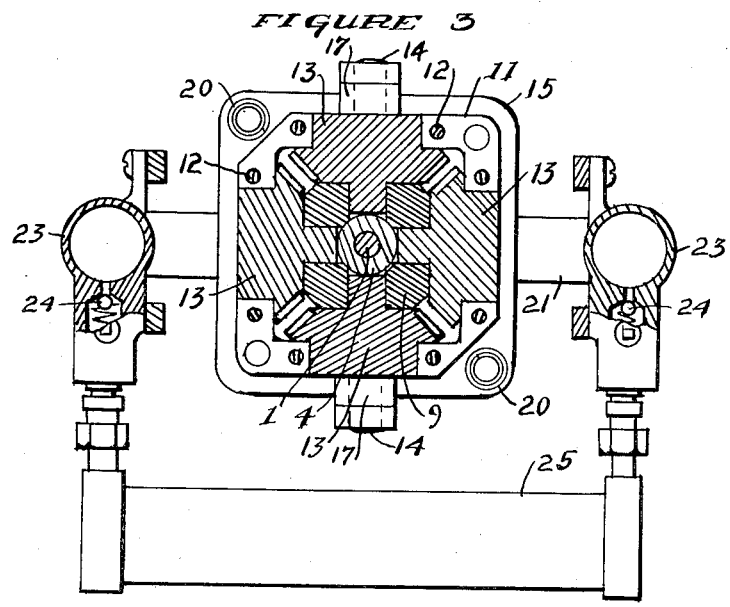
Figure 3 is a view on line 3—3 of Figure 1.
Figure 4:
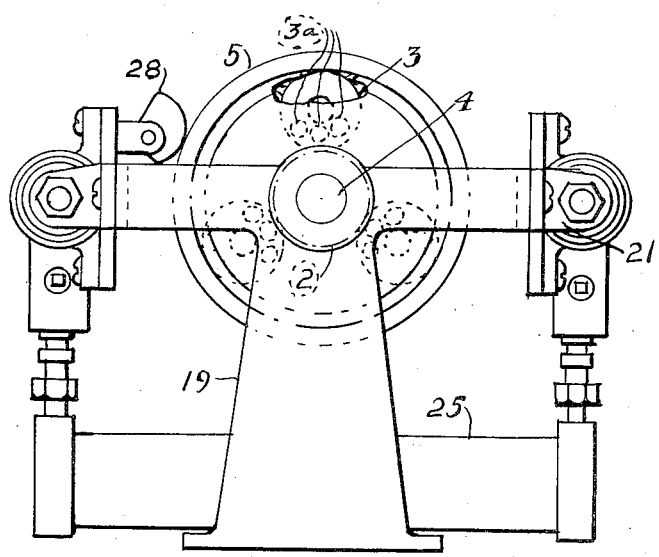
Figure 4 is an end elevation of the device as shown in Figure 1, a part being broken away.
Figure 5:
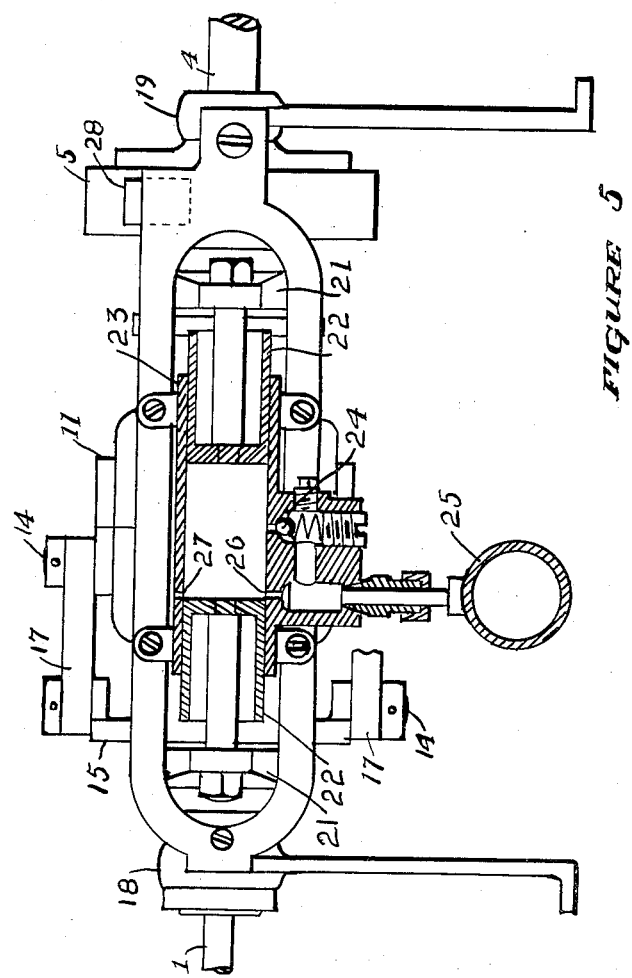
Figure 5 is a view on line 5—5 of Figure 1.

The transmission herein disclosed differs essentially from the one disclosed in my prior application in substituting a fluid resistance in place of inertia resistance, making possible a simpler construction. By fluid resistance I mean the resistance of a fluid (liquid or gaseous) to being compressed, expanded, or forced through an orifice, which of course means doing work.

I apply the active resistance thus obtained as a fulcrum to the leverage involved when it becomes necessary to multiply the torque from the drive shaft to the driven shaft. When drive shaft torque only is transmitted to the driven shaft there is no need for additional reaction resistance, or fulcrum force; a yieldable clutching device such as springs disposed between the two shafts and capable of tying the shafts together is all that is required. But when this clutching device yields, causing the two shafts to turn at different angular velocities, a connection with the supporting frame structure must be established in order to obtain a corresponding driven shaft torque increase.

In an automatic transmission of the type involved, it becomes necessary, therefore, to provide means which supplies this additional connection when needed and in intensities or magnitudes proportional to the difference in speed between drive and driven shafts. A fluid resistance as described and applied fulfills these requirements.

Essentially the device is based on the characteristics of a planetary gear set of any well-known type and the desired gear ratio. Power from a drive shaft is transmitted to a central sun gear, planetary gears journaled in a supporting spider and meshing with the sun gear transmits this power to a gear or gears surrounding the planetaries and meshing with the same, and mechanism interconnected with that planetary gearing which makes possible automatically to transmit power from the drive shaft to driven shaft at variable speeds and torque in accordance with the load.

One form of this gearing known as the internal type is shown in the drawings, in which 1 is the drive shaft, 2 the sun gear, 3 the planetary gear, 4 the supporting spider which is developed in such a manner that it also functions as the driven shaft which carries the load, and 5 the surrounding internal ring gear.

If such a gear set is tied together in such a manner that relative motion between its component parts is prevented, power from shaft 1 to shaft 4 is transmitted at equal speed and torque. For that purpose gear 5 is provided with an extended hub to which a bevel gear 6 is secured by key 7. Likewise, to driven shaft 4, on its extension surrounding drive shaft 1, is secured by key 8, a sleeve 9, which sleeve in turn is secured by key 10 to what may be properly called a differential case 11, which as commonly made is divided on its center line into two halves for convenient assembly, and suitably held together by bolts as 12.

The differential case forms the bearing support for bevel gear 6, and it also supports and encloses four additional bevel gears as 13, all alike and all in mesh with bevel gear 6. Protruding outwardly from the hub of bevel gear 13 are crank pins 14, timed in opposite pairs in line, but one hundred and eighty degrees apart relative to each pair as shown. This makes possible the imparting of parallel reciprocating motion in opposite directions to sliding members 15 and 16 through their connections with crank pins 14 by links 17, of which there are likewise four, whenever any crank motion is imparted to pins 14, which takes place only when there is any difference in angular speed between the drive shaft 1 and driven shaft 4. It may therefore readily be seen that the assembly of members described so far may be rotated as a unit without any relative motion between its comprising members as supported and journaled in bearing blocks 18 and 19, which constitute the supporting structure.

There is, however, nothing but frictional resistance which prevents relative motion and which would readily occur if there were any appreciable load on driven shaft 4, but in order to prevent relative motion to a desired degree compression springs 20 are interposed between sliding members 15 and 16, tending at all times to maintain these members in a position of maximum separation as determined by their connecting links with crank pins 14, thus in effect more or less locking the entire assembly against relative or differential motion.

In this connection it is important to point out and describe another factor which operates in that direction also. Accordingly planetary gears 3 are rendered unbalanced relative to rotation on their own axes, by drilling holes as indicated at 3a, centrifugal force tending constantly to maintain these gears in the position shown, that is, the heavy side furthest from the center of rotation of the assembly and to lock the assembly, especially at higher speeds of rotation which corresponds to high gear speed when used in an automobile, and has the effect of holding the car in high or direct gear on a grade as long as the engine is able to maintain high speed.

From the foregoing it may readily be seen that power from drive shaft 1 can be transmitted to driven shaft 4 by suitably interposing a locking mechanism, but when the torque resistance or load on shaft increases to a degree to cause this mechanism to yield, differential motion takes place. One effect of this is the slowing down of ring gear 5, which is the reaction member of the planetary gear set, which slowing down motion, if it remain unchecked, would result in running this gear in an opposite direction and stalling shaft 4. In any event, drive shaft torque only at reduced speed would be transmitted to shaft 4.

As explained above, under these conditions it becomes necessary to provide a suitable resistance to oppose the retrograde motion of ring gear 5, which reacts on the supporting frame structure, a mechanism which is substantially stationary and does not take part in the rotative motion of the general assembly.

For that purpose cross heads 21 are journaled freely on the hubs of sliding members 15 and 16, and through suitable connections operate pistons 22 in cylinder 23 secured to the stationary supporting structure.

Pistons 23 are shown in their extreme outward positions and come together closely when in their extreme inward positions, as determined by the motion of crank pin 14.

As shown in the drawings and described herewith, provision is made for compressing air trapped in the cylinder between the pistons to a pressure determined by the spring setting of check or relief valve 24. The air thus expelled from the cylinder may be stored in the receiver 25. The pistons on their outward stroke create a vacuum until port 26 in the cylinder wall is uncovered, when air from the receiver rushes in, thus completing the cycle.

At 27 an additional port to the atmosphere is shown to make up for any possible leakage of air past the pistons and to assist in re-establishing atmospheric pressure at the end of the suction stroke. In order to get approximately equal resistance to the motion of the pistons on their compression and suction strokes relief valve 24 may be adjusted for a positive pressure to somewhat equal the negative pressure of the suction stroke.

It may thus be seen that a substantially continuous reactive force is obtained, which opposes differential action of the planetary gear set in proportion to the magnitude of their differential action.

While I am showing only one method of obtaining this reactive force by alternately compressing and expanding air, I have chosen this particular method for the reason that it requires no auxiliary apparatus in order to make it operative as a complete unit, but if this transmission were to be used in an automobile it may suggest itself to utilize either intake vacuum, engine compression or exhaust pressure, or a combination of these in the cylinder, by making suitable modifications which may conceivably increase the overall efficiency of the installation for the reason that compressing or expanding air means the expenditure of energy, and unless the resultant product can be utilized to advantage negative work results. But if an otherwise wasted product of engine operation were utilized the combination of engine and transmission would operate at higher efficiency.

When installed in an automobile and the driven shaft becomes the driver as in coasting, the torque on shaft 1 is decreased with a corresponding increase in speed whenever there is any difference in speed between these shafts.

If it is desired to limit the difference in speed between the drive and driven shafts to the planetary gear ratio, friction pawl 28, or any well-known one-way clutching device applied to a convenient circular surface of internal gear 5 and secured to the framework will accomplish this by preventing motion in an opposite direction to the general direction of rotation.

I claim:

1. In an automatic transmission power transmitting gearing comprising a driving member, a driven member, and a reaction member; mechanism for restraining motion between members of said power transmission gearing, said mechanism comprising a bevelled gear secured to said reaction member, a plurality of gears in mesh with said bevelled gear, said plurality of gears having crank pins, said crank pins being linked to sliding members, and springs between said sliding members for the purpose described, a differential case secured to the planetary driven member, said power transmitting gearing and said motion restraining mechanism being rotatably mounted in a stationary supporting structure, and reaction resisting mechanism comprising a cylinder and a piston secured to said supporting structure and operatively inter-connected with said planetary reaction member and said planetary driven member.

2. In combination, nonrotating supporting means, cylinders mounted thereon provided with fluid inlet and discharge ports, opposed pistons mounted in each cylinder, opposed means connecting each set of corresponding pistons to move as a unit therewith and mounted to reciprocate on a common axis, resilient means disposed to urge said connecting means away from each other, a drive shaft and a driven shaft, a planetary gearing connecting the same, control gearing associated with the planetary gearing, and eccentric connections between the control gearing and the opposed connecting means whereby rotation of the control gearing relative to said shafts will actuate the opposed connecting means in opposite directions.

3. In combination, a drive shaft and a driven shaft, a planetary gearing connecting said shafts, and controlling gearing associated with the planetary gearing, a pair of cylinders fixedly mounted relative to the shafts in parallel relation with said shafts and on opposite sides thereof and provided with inlet and exhaust ports, a pair of opposed pistons mounted in each cylinder, a cross-head connecting each corresponding pair of pistons and slidably mounted relative to said shafts and in axial alignment therewith, yieldable means inserted between said cross-heads to urge the same in opposite directions, and control-gearing-actuated means connected to the cross-heads to urge the same in opposite directions.

4. In combination, nonrotatable supporting means, planetary-gearing-connected drive and driven shafts mounted thereon, a rotatable reaction member associated with said gearing, a control gearing assembly connecting the reaction member and driven shaft to rotate therewith, and automatically operated fluid-pressure-control means connected with the control gearing assembly and mounted as a unitary part of the supporting means.

5. In combination, nonrotatable supporting means, planetary-gearing-connected drive and driven shafts mounted thereon, a rotatable reaction member associated with said gearing, a control gearing assembly connecting the reaction member and driven shaft to rotate therewith, and automatically operated alternately acting positive and negative fluid-pressure-control means connected with the control gearing assembly and mounted as a unitary part of the supporting means.

6. In combination, nonrotatable supporting means, planetary-gearing-connected drive and driven shafts mounted thereon, a rotatable reaction member associated with said gearing, a control gearing assembly connecting the reaction member and driven shaft to rotate therewith, automatically operated alternately acting positive and negative fluid-pressure-control means connected with the control gearing assembly and mounted as a unitary part of the supporting means, and means associated with the fluid-pressure-control means to resist action in one direction.

JOHN KROHN.